(12) United States Patent
Meyer et al.

(10) Patent No.: US 6,600,279 B2
(45) Date of Patent: Jul. 29, 2003

(54) CIRCUIT FOR THE SENSORLESS COMMUTATION OF A DC MOTOR

(75) Inventors: Helmut Meyer, Wiesloch (DE); Josef Reiter, Eppelheim (DE); Johann Schunn, Leimen (DE); Reiner Villhauer, Altlussheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/006,426

(22) Filed: Dec. 7, 2001

(65) Prior Publication Data

US 2002/0070695 A1 Jun. 13, 2002

(30) Foreign Application Priority Data

Dec. 7, 2000 (DE) .......................................... 100 60 759

(51) Int. Cl.[7] ................................................. H02P 3/08
(52) U.S. Cl. ....................... 318/254; 318/138; 318/439; 318/459; 318/500
(58) Field of Search ................................. 318/254, 439, 318/138, 459, 500

(56) References Cited

U.S. PATENT DOCUMENTS

| 4,641,066 A | * | 2/1987 | Nagata et al. ............... 318/254 |
| 4,912,378 A | | 3/1990 | Vukosavic |
| 4,922,169 A | * | 5/1990 | Freeman ....................... 318/254 |
| 5,202,612 A | | 4/1993 | Yoshida et al. |
| 5,481,166 A | * | 1/1996 | Moreira ....................... 318/254 |

FOREIGN PATENT DOCUMENTS

| DE | 26 04 638 | 8/1977 |
| DE | 26 04 638 B2 | 6/1981 |

* cited by examiner

Primary Examiner—Bentsu Ro
Assistant Examiner—Rina I. Duda
(74) Attorney, Agent, or Firm—Laurence A. Greenberg; Werner H. Stemer; Ralph E. Locher

(57) ABSTRACT

The system provides for the commutation of a brushless direct-current motor. A virtual star is provided that is analogous to the motor. The virtual star is formed of resistors. A comparison device continuously comparing the voltages of the two star center points of the motor star and the virtual star in all phases. The comparison results are used to generate a signal for controlling the commutation.

1 Claim, 2 Drawing Sheets

CIRCUIT FOR THE SENSORLESS COMMUTATION OF A DC MOTOR

BACKGROUND OF THE INVENTION

FIELD OF THE INVENTION

The invention relates to a brushless direct-current motor, in particular to a commutation circuit for such a motor. The system involves motors with a permanent magnetic rotor with an arbitrary number of pole pairs and a stator with at least two windings, which form a multiphase system. Each phase can be switched by means of electronic switch elements as a function of voltages that are induced in the windings by the permanent magnetic field of the rotor. Depending on the state of commutation, this leads to the performing of commutation steps at the negative and/or positive poles of a direct-current source.

If direct-current motors are commutated electronically, then the instantaneous rotor position must be ascertained each time. For this purpose, sensors are typically used, such as Hall generators or photodiodes.

It is also known for the voltages induced in the armature windings to be measured at whichever instants are currentless, and thus to detect the rotor position and from that to obtain appropriate signals for stepped switching of the commutation.

German Patent Application DE 26 04 638 A describes a control circuit for a collectorless direct-current motor. There, the algebraic sign pattern of the voltages induced in the three phases in relation to a reference voltage is utilized for commutation. To do so, however, at any arbitrary instant, at least one of the phases has to be currentless. This means that for a certain period of time, such as one complete half-wave, the current must be switched off so that the induced voltage can be determined with the requisite safety. Because of the common reference potential necessary for measuring the level, this control circuit can be used only for star-connected motors with a star center point extended to the outside. Moreover, that circuit furthermore requires a special starting logic.

SUMMARY OF THE INVENTION

It is accordingly an object of the invention to provide a system for sensorless commutation, which overcomes the above-mentioned disadvantages of the heretofore-known devices and methods of this general type and which provides for a commutation circuit for a brushless direct-current motor that is simple in design and economical to produce, that requires no angle detecting device built into the machine or mounted on it, and that reliably step-switches the stator rotary field from the angular position of the rotor in any rpm range.

With the foregoing and other objects in view there is provided, in accordance with the invention, a commutation circuit for a brushless direct-current motor having a motor star circuit. The novel circuit comprises:

a virtual star circuit analogous to the motor star circuit and formed of a plurality of resistors, the virtual star circuit and the motor star circuit each having a star center point carrying a voltage;

a comparator device connected to the virtual star circuit and to the motor star circuit for continuously comparing the voltages of the star center points of the motor star and of the virtual star in all phases and for outputting a comparison value; and a device connected to receive the comparison value and for generating a commutation signal from the comparison value for controlling a commutation of the direct-current motor.

In other words, analogously to the motor star, a further, virtual star is formed of resistors. The voltages present at the star center points of the two stars are compared with one another and evaluated. The zero-point crossovers are evaluated for the correct-angle commutation of the various phases.

For startup, a ramp-function generator is used, for instance in the form of a pulse generator. When a certain torque is reached, this ramp-function generator is no longer needed.

The signals obtained from the voltage comparison are supplied to the counter and decoder circuit and from there are carried on to the transistors.

It is also possible to ignore the fact that there is no linear relationship between the currents and voltages of the real machine on the one hand and the virtual star circuit, formed of resistors, on the other, because compensation takes place between each two or three variables X, Y and Z.

The invention attains the stated object in that by evaluation of the comparative measurement between the motor star center point and the virtual star center point, the electromotive force (EMF) of the motor is detected continuously, and thus the values of all three phases are measured continuously.

The effort and expense for evaluating the EMF is relatively slight. The instant of commutation is determined very precisely, and in any case more precisely than with a mechanical position generator. The circuit is economical and is not vulnerable to malfunctions.

Other features which are considered as characteristic for the invention are set forth in the appended claims.

Although the invention is illustrated and described herein as embodied in generatorless commutation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
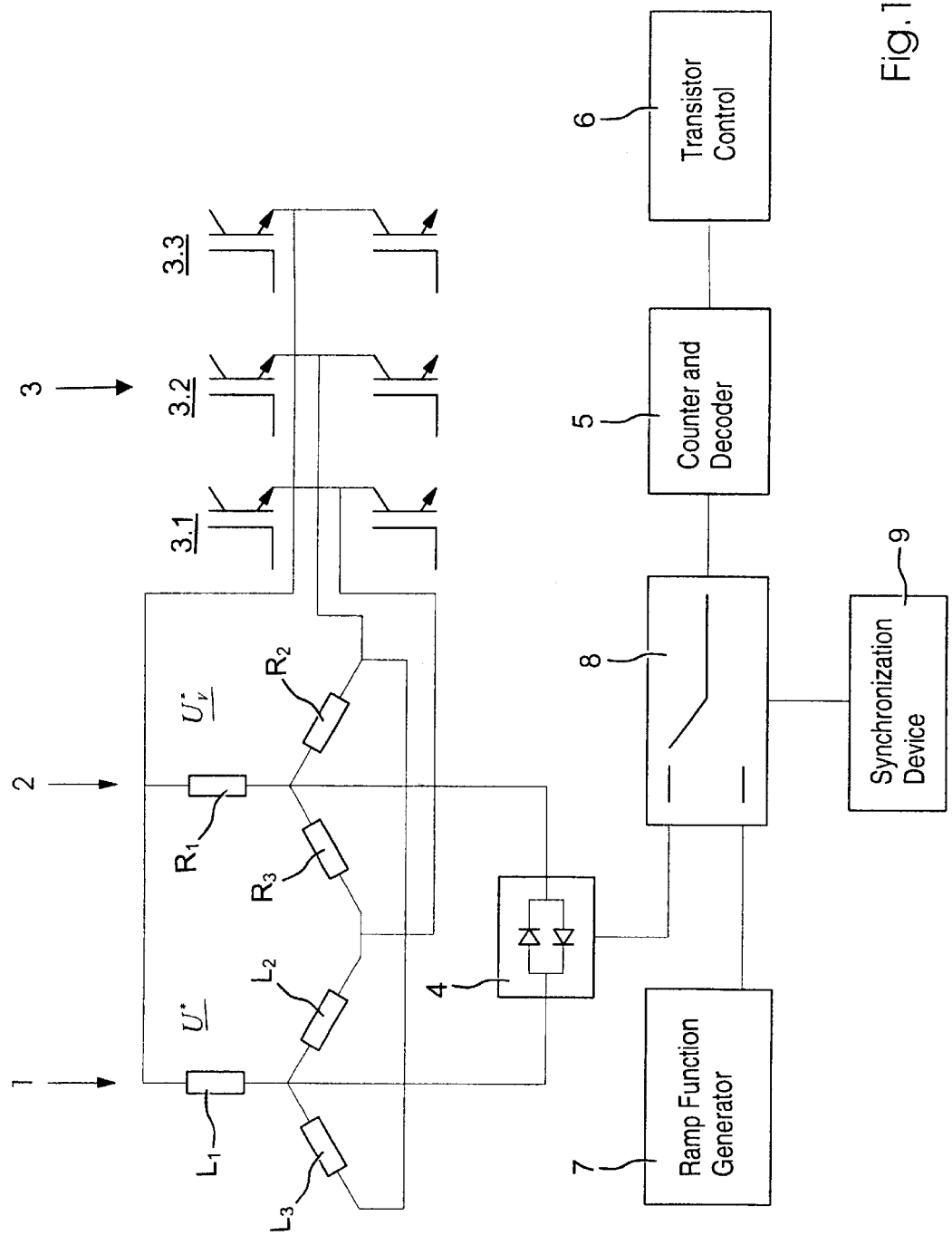
FIG. 1 is a schematic block circuit diagram, illustrating the layout of a commutation circuit of the invention for a brushless dc motor.

Referring now to the figures of the drawing in detail and first, particularly, to FIG. 1 thereof, there is shown a motor star 1 with inductors $L_1$, $L_2$, $L_3$ (representing the star point phases X, Y, Z) and a virtual star 2 with resistors $R_1$, $R_2$, $R_3$.

The star circuits are connected to a classical end stage 3, which has the individual end stages 3.1, 3.2, 3.3. The end stage 3, by way of example, may bi a MOSFET circuit of an IGBT circuit.

An evaluation circuit 4 is connected downstream of the two star center points of the motor star 1 and virtual star 2. The evaluation circuit 4 has two optocouplers connected antiparallel. The output transistors of the optocouplers are connected in parallel and have a common pull-up resistor.

If there is no voltage difference between the two star center points of the motor star 1 and the virtual star 2, then no current flows via the optocouplers, either. In that case, the level is "high."

If there is a voltage difference between the two star center points, then a current is flowing. An optocoupler then switches. An output level is then "low."

The signal generated by the evaluation circuit 4 is input to a counter and decoder 5. From the input signals, the counter and decoder 5 generates the pulses for the transistors of the end stage, indicated at the box labeled transistor control 6.

In the standstill condition, there is still no voltage at the motor star 1 and the virtual star 2. Accordingly, no pulses are gene rated initially. A ramp-function generator 7 is therefore provided. It generates pulses similar to those that the evaluation circuit 4 furnishes during regular operation.

The ramp-function generator 7 is used to run up the motor to its synchronized speed. Once that has been attained, the ramp-function generator is switched off. In the meantime, the evaluation circuit 4 furnishes signals. These signals are added. This is done by means of a shunt 8. The shunt 8 is in turn, when the synchronized rpm is reached, switched over from the ramp-function generator 7 to the evaluation circuit 4 by a synchronizing device 9.

Figure 2:
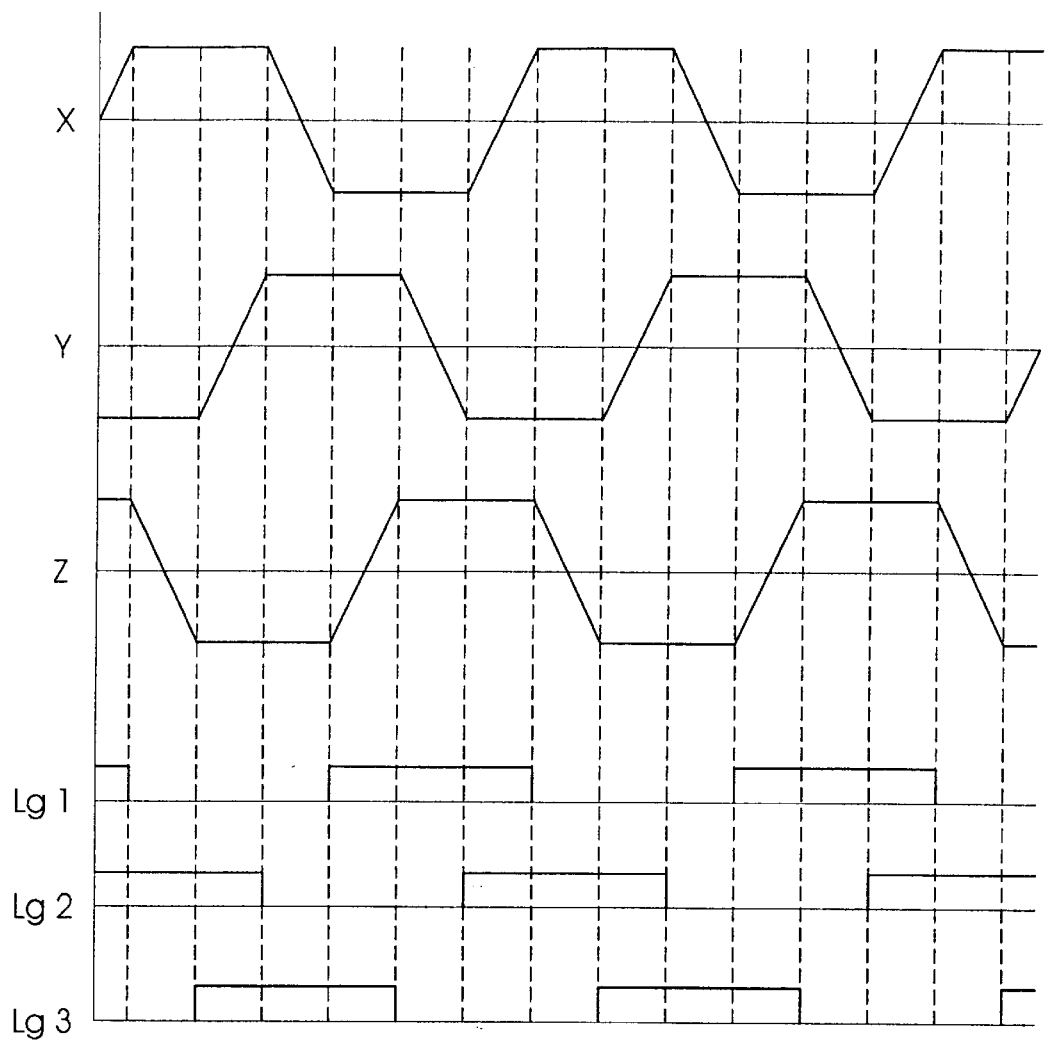
FIG. 2 is a graphical illustration showing the voltages of the three phases and the signals obtained from them for a classical commutation circuit and for a circuit according to the invention.
Figure 2:
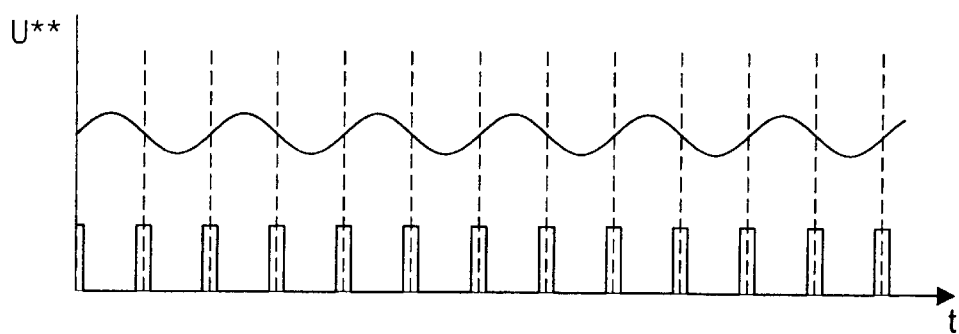

Referring now to FIG. 2, in the upper part the voltage prevailing at the star center points is shown for the three phases X, Y, and Z. The course of the voltage over time is trapezoidal. It is shifted by 120° between each of the individual phases.

The middle part of FIG. 2 shows the signals of position generators for a conventional motor, which does not have the characteristics of the invention. They are graphed at Lg1, Lg2, and Lg3.

The signals of the position transducers are generated by Hall sensors built into the motor. They serve to commutate the motor.

In accordance with the invention, such position generators are not necessary. They can accordingly be dispensed with.

The lower part of FIG. 2 again shows the course of the voltage $U^{}$ over the time t. A sinusoidal curve can be seen, which represents the voltage difference between the two star center points, i.e., $U^{}=U^{*}-U_{v}^{*}$. Below the sinusoidal curve $U^{**}$, there is graphed the signal voltage generated by the evaluation circuit 4. The latter is a square-wave signal that forms the input to the counter-decoder 5 during steady-state operation.

We claim:

1. A commutation circuit for a brushless direct-current motor having a motor star circuit, comprising:

a virtual star circuit analogous to the motor star circuit and formed of a plurality of resistors, said virtual star circuit and the motor star circuit each having a star center point carrying a voltage;

a comparator device connected to said virtual star circuit and to the motor star circuit for continuously comparing the voltages of the star center points of the motor star circuit and of said virtual star circuit in all phases and for outputting a comparison value;

said comparator device being at least two optocouplers connected anti-parallel; and a device connected to receive the comparison value and for generating a commutation signal from the comparison value for controlling a commutation of the direct-current motor.

\* \* \* \* \*